April 23, 1963 A. BOUDOURIS 3,087,146

SIGNALING SYSTEM EMPLOYING A REMOTELY CONTROLLED SWITCH

Filed Oct. 26, 1959

INVENTOR.
ANGELO BOUDOURIS

By

Owen & Owen 3,087,146
Patented Apr. 23, 1963

1

3,087,146

SIGNALING SYSTEM EMPLOYING A REMOTELY CONTROLLED SWITCH

Angelo Boudouris, 5856 Highland View Drive, Sylvania, Ohio

Filed Oct. 26, 1959, Ser. No. 848,845
2 Claims. (Cl. 340—332)

This invention relates to a system for operating a signal at one point from a remote point and more particularly to a signaling system employed with a communication system connecting two or more spaced points.

The signaling system according to the invention can be used with a communication system adaptable for many applications, as for drive-in restaurants, hospitals, ships, offices, etc. In a signaling system, a signal must be operated at one point when a function is performed at another point, and also must be rendered inoperable at a proper time. For example, in an order-taking system for drive-in restaurants, a customer drives into a station at a remote point at the restaurant and, when ready to order, presses a switch which operates a signal in a central unit at a second, spaced point, which signal indicates to an operator at the second point that the customer is ready to place an order for food. The operator then completes a communication circuit to the station and takes the order. When this is completed, the operator closes a cancel switch which causes a heavy current to be supplied to the customer's switch. This opens the customer's switch and causes the signal at the second point to become inoperative.

Frequently, due to carelessness or maliciousness, a customer will continue to hold his switch closed after his order has been given. The signaling system thus fails to function properly because the signal will become operative again when the cancel switch is opened, and thereby give a false signal to the operator that the customer wishes to order again. Also, the heavy current passing through the cancel switch may cause the contacts thereof to burn when opened, if the customer's switch should still be closed. Further, in some drive-in circuits having means for automatically indexing from one customer whose order has been taken to another waiting to place an order, the indexing cannot be accomplished as long as the first customer continues to hold his switch closed.

The present invention provides a signaling system in which a signal always will be rendered inoperative at the proper time regardless of the actions of the signaling party with respect to his signal switch. With a signaling system according to the invention, there is no possibility of components thereof being damaged by heavy current, even if the signaling party should attempt to hold his signal switch in when it is opened by the party at the point where the signal is located. Further, a negligent or malicious signaling party cannot prevent indexing to another party wishing to place an order.

It is, therefore, a principal object of the invention to provide an improved signaling system for operating a signal at one point from another point and for cancelling the signal from the former point.

Another object of the invention is to provide an improved signaling system in which a signaling switch at one point can be opened by means at a second point regardless of the actions of a party at the first point.

2

Still another object of the invention is to provide a signaling system including a signal switch at one point for operating a signal at a second point, a switch at the second point for opening the switch at the first point, and means for assuring that the first switch will open even if an attempt is made to hold the first switch closed.

Other objects and advantages of the invention will be apparent from the following detailed description of a preferred embodiment thereof, reference being made to the accompanying drawing, in which.

Figure 1:
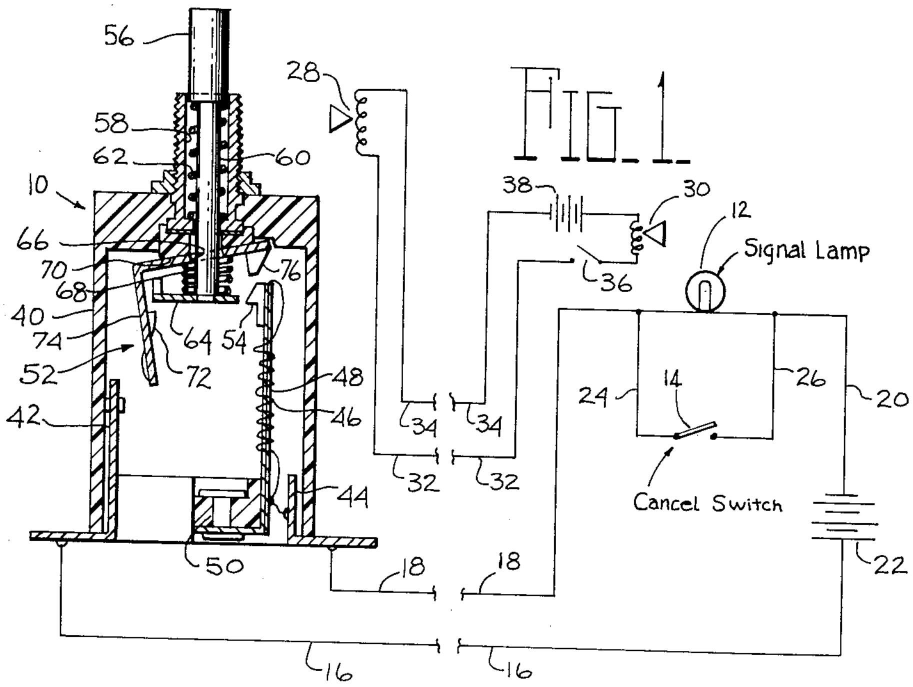
FIG. 1 is a view of a signaling circuit according to the invention employing a switch shown in cross section, in an open position.

Referring to the drawings, and more particularly to FIG. 1, a signaling system according to the invention includes a signaling switch 10 located at one point, and a signal 12 along with a cancel switch 14 located at another point. The signal 12 can be a lamp, as shown, a buzzer, or other electrical signaling device. Conductors 16, 18, and 20 connect the switch 10 and the signal 12 in series with a battery or suitable source of current 22 and conductors 24 and 26 connect the cancel switch 14 in parallel with the signal 12. The signaling switch 10 when closed operates the signal 12 and the cancel switch 14, when closed, supplies a relatively heavy current to the switch 10 and causes it to open, as will be discussed more fully subsequently. The current in the circuit when the cancel switch 14 is closed is heavier than that when only the switch 10 is closed because the signal 12 is substantially by-passed when the switch 14 is closed and its resistance is substantially cut out of the circuit.

The signaling system can be employed in a communication system also represented in FIG. 1. The communication system includes an electro-acoustic transducer 28 located at the first point along with the switch 10, and a second electro-acoustic transducer 30 located at the second point along with the signal 12 and the cancel switch 14. The electro-acoustic transducers 28 and 30 are connected by lines 32 and 34, one of which contains a transducer switch 36 located at the second point. A suitable source of current such as a battery 38 supplies power for the transducers. Each of the electro-acoustic transducers 28 and 30 can serve as a speaker and a microphone if two-way communication is desired between the two points, or either of these transducers can be a microphone and the other can be a speaker if communication is desired in only one direction between the points.

When a party at the first point closes the switch 10 and operates the signal 12, a party at the second point can then close the switch 36 and communicate with the party at the first point through the transducers 28 and 30. The switch 36 also can be located at the first point and operated by the first party. In this instance, the signal 12 would only notify the second party that the first party is going to communicate with him. Of course, the communication circuit will contain an appropriate amplifier and, for a two-way system, relays to hook the input and output of the amplifier into the circuit in the proper direction when the transducers 28 and 30 are used as combination speakers and microphones.

Referring now in more detail to the switch 10, the specific form of the thermal-release type switch includes a non-conductive housing 40, a long terminal 42 connected electrically to the conductor 16, and a short terminal 44 connected to the conductor 18. The upper end of the terminal 44 is connected electrically to a heating coil 46 wrapped around a bi-metallic strip 48 which is anchored to a lower portion of the housing 40 by means of a rivet 50, or other suitable fastener. An L-shaped conducting connector 52 completes a circuit between the terminals 42 and 44 by connecting electrically the terminal 42 with a hook 54 of the bi-metallic strip 46, which hook is connected electrically through the coil 46 to the terminal 44. Hence, an electrical path can be completed through the terminal 42, the connector 52, the hook 54, the heating coil 46, and the terminal 44.

Figure 2:
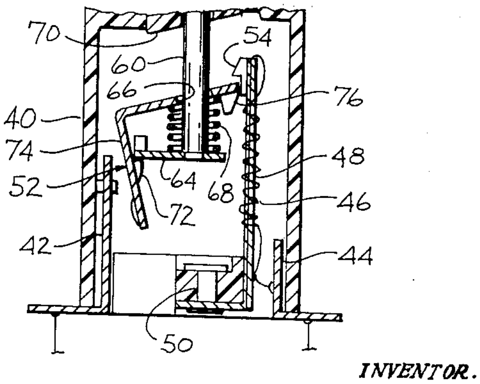
FIG. 2 is a fragmentary view in cross section of the switch shown in FIG. 1, in a position between open and closed.

The connector 52 is pushed downwardly into contact with the terminal 42 and the hook 54 by means of a push button 56 guided in a cylinder 58 held in an upper portion of the housing 40. The button 56 is connected to a shank 60 and is urged upwardly by a spring 62 in the cylinder 58, the shank 60 extending downwardly into the interior of the housing 40 where it is connected to a drive plate 64. The shank 60 also extends through a hole 66 in the L-shaped connector 52 and through a spring 68 located between the connector 52 and the drive plate 64 which is urged upwardly by means of the spring 62. In turn the plate urges the connector 52 upwardly against a sloping part 70 of the housing 40. Even when the button 56 and the shank 60 are pushed downwardly, the spring 68 continues to urge the connector 52 against the sloping part 70 and to maintain the connector at an angle until the drive plate 64 engages a nib 72 on a leg 74 of the connector. As the button 56 is pushed downwardly, the connector 52 also moves downwardly because of the engagement of the drive plate 64 and the nib 72. A tapered projection 76 helps the conductor 52 to move downwardly past the hook 54 to the position shown in FIG. 2. However, the conductor 52 is not yet in contact with the terminal 42 so that no circuit is completed and the switch 10 remains open.

Figure 3:
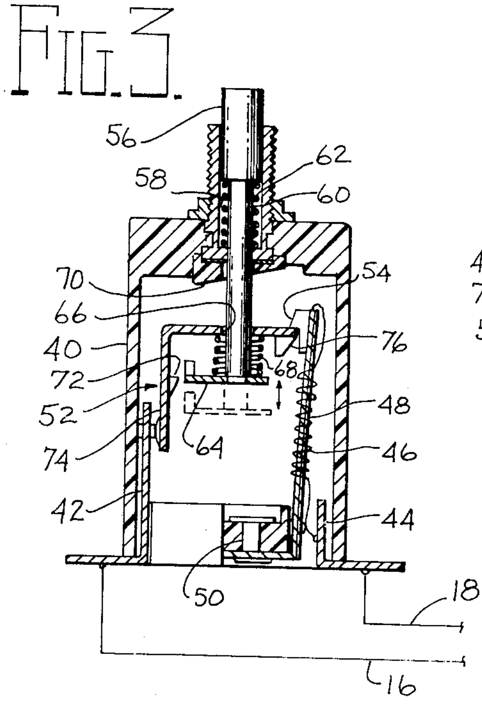
FIG. 3 is a view in cross section of the switch shown in FIG. 1, in closed position.

If pressure on the button 56 is now relieved so as to enable the spring 62 to move the drive plate 64 upwardly, the upper, right end of the connector 52 will catch on the hook 54 and as the drive plate moves farther upwardly, the connector 52 pivots around the hook 54 in a clockwise direction until the nib 72 swings free of the drive plate 64 and the spring 68 further pivots the conductor 52 until the leg 74 contacts the terminal 42 (FIG. 3), thus completing a circuit and closing the switch. The button 56 can then be released completely to move the drive plate 64 from the position shown in dotted lines in FIG. 3 to the position shown in solid lines. At this point, no further pressing of the button 56 will affect the position of the switch because the shank 66 and the drive plate 64 can reciprocate vertically without touching the nib 72. No action by the signaling party can possibly affect the position of the switch 10 until it is opened by the cancel switch 14.

With the button 56 pressed, the signal 12 will be operated, current flowing from the source 22 through the conductor 16, the terminal 42, the L-shaped connector 52, the hook 54, the coil 46, the terminal 44, the conductor 18, the signal 12, and the conductor 20. If the cancel switch 14 is now closed, the signal 12 is by-passed, thus establishing a circuit of lower resistance and, hence, a heavier current. This current flows through the coil 46 and heats it, thereby causing the bi-metallic strip 48 to bend, in this case in a clockwise direction. When the strip 48 has bent far enough, the hook 54 is freed from the conductor 52 which immediately snaps upwardly against the sloping part 70, due to the force of the spring 62 and the spring 68. Even if the push button 56 is held inwardly as far as possible, the spring 68 is of sufficient length and strength to push the conductor 52 upwardly away from the terminals 42 and 44, even with the drive plate 64 in its lowest position. Thus, the cancel switch 14 will always open the signaling switch 10, regardless of the actions of the party at the first point. With a conventional thermal-release switch, if the button were held in, the signal would again operate when the cancel switch were open and thereby produce a false signal.

The switch 14 must be held closed long enough for the coil 46 to heat the strip 48 sufficiently to free the hook 54. This can be accomplished by a time delay relay or by any other suitable automatic means or, of course, can be done manually simply by holding the switch 14 closed for approximately three seconds, which is sufficient time to open the switch 10. It will be readily understood that current can be supplied to the coil 46 from a separate source of current and that the coil 46 can be entirely separate from the rest of the signaling circuit.

It will readily be understood by those skilled in the art that a magnetic trip switch can be employed in place of the thermal-release switch 10. In such a switch, the coil 46 would energize a magnet adjacent a strip of magnetic material used in place of the bimetallic strip 48 and would pull the strip away from the drive plate 64 when the heavier current were supplied thereto. The magnetic trip switch would be tripped immediately when the cancel switch is closed, and thus eliminate a two or three second delay.

Numerous modifications will be apparent to those skilled in the art after reading the above description and viewing the accompanying drawing. It is to be understood that such modifications can be employed without departing from the scope of the invention, if within the spirit of the appended claims.

I claim:

1. In a communication system including a central station and at least one remote station, a signalling system for producing a signal at the central station from the remote station and for cancelling the signal from the central station, said signalling system comprising a signalling switch at the remote station, manual means for closing said switch, latch means for holding said switch in the closed position, means for releasing and opening said switch when a relative heavy current is supplied thereto, said releasing and opening means being effective to release and open said switch regardless of the position of said manual means, a source of power, signal apparatus at the central station, means for connecting electrically said source of power, said signal apparatus, and said signalling switch whereby said signal apparatus will operate when said switch is closed and said signal apparatus will be inoperative when said switch is open, and switch means connected electrically in parallel with said signal apparatus for supplying the relatively heavy current to said releasing and opening means at a predetermined time to open said signalling switch and to render said signal inoperative.

2. In a communication system including a central station and at least one remote station, a signalling system for producing a signal at said central station from said remote station, said signalling system comprising signal apparatus at said central station, a signalling switch at said remote station, said switch including a pair of terminals, connector means for electrically connecting said terminals, means including manually operable means for moving said connector means into electrical contact with said terminals, means for urging said connector means out of contact with said terminals, means for holding said connector means in electrical contact with said terminals, and electrically operated means for releasing said holding means regardless of the position of said manually operable means only when said connector means is in electrical contact with said terminals, a source of power, means electrically connecting said source of power, said signal apparatus, and said signalling switch whereby said signal apparatus will be inoperative when said switch is open and will be operative when said switch is closed, and means connected with said electrically connecting means and including switch means at said central station for supplying electricity to said releasing means at a predetermined time to open said signalling switch and to render said signal apparatus inoperative.

References Cited in the file of this patent

UNITED STATES PATENTS

| | | |
|---|---|---|
| 642,362 | Pfatischer | Jan. 30, 1900 |
| 998,705 | Manson | July 25, 1911 |
| 1,927,362 | Ekman | Sept. 19, 1933 |
| 1,944,326 | Hudson | Jan. 23, 1934 |
| 2,496,135 | Sedwitz | Jan. 31, 1950 |
| 2,937,370 | Dugan | May 17, 1960 |
| 2,952,757 | Ellenberger | Sept. 13, 1960 |

FOREIGN PATENTS

| | | |
|---|---|---|
| 479,516 | Great Britain | Feb. 7, 1938 |